United States Patent
Ryu et al.

(10) Patent No.: US 7,644,174 B2
(45) Date of Patent: Jan. 5, 2010

(54) METHOD OF AND APPARATUS FOR TRANSMITTING UNIVERSAL PLUG AND PLAY AUDIO/VIDEO STREAM

(75) Inventors: Hyun-surk Ryu, Suwon-si (KR); Fei fei Feng, Yongin-si (KR); Cornelis Johannis Den Hollander, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 11/487,466

(22) Filed: Jul. 17, 2006

(65) Prior Publication Data

US 2007/0174478 A1 Jul. 26, 2007

Related U.S. Application Data

(60) Provisional application No. 60/699,388, filed on Jul. 15, 2005.

(30) Foreign Application Priority Data

Apr. 12, 2006 (KR) ................. 10-2006-0033192
Jul. 10, 2006 (KR) ................. 10-2006-0064584

(51) Int. Cl.
    *G06F 15/16* (2006.01)
(52) U.S. Cl. ............ 709/231; 709/709; 709/217; 709/218; 709/219; 709/220; 709/225; 709/227; 709/228; 709/230; 709/232
(58) Field of Classification Search ........ 709/230–232, 709/227–228, 217–219, 220, 225
    See application file for complete search history.

(56) References Cited

U.S. PATENT DOCUMENTS

| | | | |
|---|---|---|---|
| 6,847,620 B1 * | 1/2005 | Meier | 370/328 |
| 7,515,535 B2 * | 4/2009 | Finn | 370/230 |
| 7,523,214 B2 * | 4/2009 | Kikkawa et al. | 709/231 |
| 2004/0031058 A1 * | 2/2004 | Reisman | 725/112 |
| 2004/0246992 A1 * | 12/2004 | Henry et al. | 370/467 |
| 2005/0068914 A1 * | 3/2005 | Lee et al. | 370/312 |
| 2005/0078679 A1 * | 4/2005 | Henry et al. | 370/395.2 |
| 2005/0188193 A1 * | 8/2005 | Kuehnel et al. | 713/155 |
| 2005/0204065 A1 * | 9/2005 | Son et al. | 709/248 |
| 2006/0004576 A1 * | 1/2006 | Kishida | 704/258 |
| 2006/0023697 A1 * | 2/2006 | Shore et al. | 370/352 |
| 2006/0056414 A1 * | 3/2006 | Elie-Dit-Cosaque et al. | 370/392 |
| 2006/0106750 A1 * | 5/2006 | Smith | 707/1 |

(Continued)

OTHER PUBLICATIONS

Feng et al. "End-to-end Stream Establishment in Consumer Home Networks," IEEE 2006.*

(Continued)

*Primary Examiner*—Alina N. Boutah
(74) *Attorney, Agent, or Firm*—Sughrue Mion, PLLC

(57) ABSTRACT

A method of and an apparatus for transmitting a universal plug and play audio/video (UPnP-AV) stream is disclosed, which transmits a media stream from a media server to an media renderer, using an integrated protocol which combines an universal plug and play (UPnP) audio/video (AV) protocol and a residential Ethernet (ResE) subscription protocol. According to the method, an integrated protocol combining an UPnP-AV protocol and an Ethernet protocol can be used. Additionally, a secured quality of service (QoS) can be provided for the UPnP-AV stream.

20 Claims, 2 Drawing Sheets

U.S. PATENT DOCUMENTS

| | | | |
|---|---|---|---|
| 2006/0127091 A1* | 6/2006 | Yoo et al. | 398/69 |
| 2006/0133414 A1* | 6/2006 | Luoma et al. | 370/466 |
| 2006/0164550 A1* | 7/2006 | Yoshimoto et al. | 348/571 |
| 2006/0212531 A1* | 9/2006 | Kikkawa et al. | 709/217 |
| 2006/0242664 A1* | 10/2006 | Kikkawa et al. | 725/37 |
| 2007/0071012 A1* | 3/2007 | Park et al. | 370/395.53 |
| 2007/0074163 A1* | 3/2007 | Van Gassel et al. | 717/120 |
| 2007/0239821 A1* | 10/2007 | Huettner | 709/201 |
| 2007/0280145 A1* | 12/2007 | Ahn et al. | 370/312 |
| 2008/0112433 A1* | 5/2008 | Feng et al. | 370/465 |
| 2008/0239957 A1* | 10/2008 | Tokura et al. | 370/235 |

OTHER PUBLICATIONS

Chapter 4: Generic Attribute Registration Protocol (GARP), 2004.*

* cited by examiner

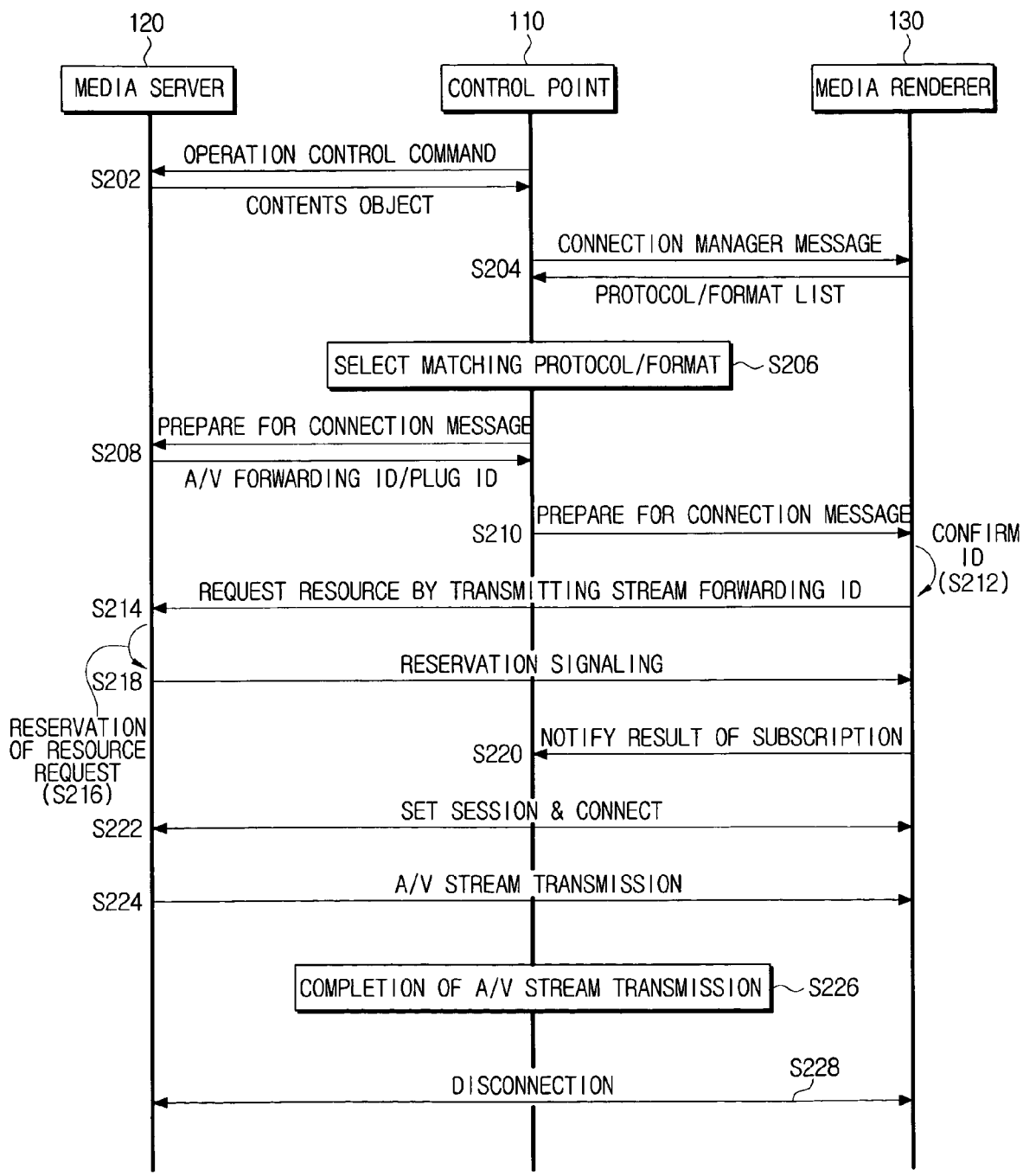

METHOD OF AND APPARATUS FOR TRANSMITTING UNIVERSAL PLUG AND PLAY AUDIO/VIDEO STREAM

This application claims benefit from U.S. Provisional Patent Application No. 60/699,388, filed on Jul. 15, 2005, in the United States Patent and Trademark Office, and claims the benefit under 35 U.S.C. §119(a) of Korean Patent Application Nos. 2006-33192 filed on Apr. 12, 2006 and 2006-64584 filed on Jul. 10, 2006 in the Korean Intellectual Property Office, the entire disclosures of which are incorporated herein by reference.

BACKGROUND OF THE INVENTION

1. Field of the Invention

Apparatuses and methods consistent with the present invention relate to transmitting a universal plug and play audio/video stream, and more particularly, to transmitting a universal plug and play audio/video (UPnP-AV) stream, which transmits a media stream using an integrated protocol of an UPnP-AV protocol for a home network service and a residential Ethernet subscription protocol.

2. Description of the Related Art

Generally, a universal plug and play (UPNP) is a networking architecture, which enables network home devices, such as PCs, PDAs, printers, wideband routers, home appliances, and others, to perform plug and play functions in home networks.

UPNP is a technology of extending a simple ability of plug and play of devices in an operating system (OS) to the entire network. Also, UPNP-AV has been developed in a general UPNP architecture, especially for an AV content transmission among network devices. In addition to UPNP, experience of zero-configuration multimedia becomes possible at home.

Currently, a residential Ethernet is a new standardization scheme in the IEEE 802 Working Group. The residential Ethernet provides a time-sensitive delivery with respect to a reliable point-to-point universal intermediate-layer cable media among endpoints. The AV applications can set isochronous stream connections on the residential Ethernet.

Currently, UPnP-AV support four types of transmission protocols, such as "http-get", "rtsp-rtp-udp", "internal", and "ice 61883", clearly defined. However, in the UPnP-AV, an integrated transmission protocol, in addition to the residential Ethernet, has not yet been considered.

In addition, the residential Ethernet (ResE) can provide secured quality of service (QoS) 2-layer connections for the AV stream. However, in the actual AV applications, it has not been considered how to use such a connection service.

SUMMARY OF THE INVENTION

The present invention has been developed in order to solve the above drawbacks and other problems associated with the conventional arrangement. An aspect of the present invention is to provide a method of, and an apparatus for transmitting a universal plug and play audio/video (UPnP-AV) stream, which transmits a media stream using a transmission protocol integrating an UPNP-AV protocol used for a home network service and a residential Ethernet (ResE) subscription protocol.

According to one aspect of the present invention, there is provided a method of transmitting a universal plug and play (UPNP) audio/video (A/V) stream, comprising a media renderer, preparing for a connection with a media server to discover a service according to an Ethernet protocol, the media renderer, setting a multicast connection with the media server, and the media server, multicasting the media stream to the media renderer according to the Ethernet protocol.

After the multicasting of the media stream, the media renderer disconnecting from the media server when the transmission of the media stream may be completed.

The Ethernet protocol may include a residential Ethernet (ResE) subscription protocol.

In the preparing for the connection with the media server, a control point, which transmits a control command about the transmission of the media stream, requests a connection management/protocol information by transmitting a connection manager message to the media renderer, receives a protocol/format list from the media renderer and selects one protocol/format from the received list.

In the preparing for the connection with the media server, the control point requests the preparation connection by transmitting a PrepareForConnection message to the media server, and the media server transmits a connection ID containing a plug ID and a stream forwarding ID to the control point.

In the preparing for the connection with the media server, the control point requests preparation of connection by transmitting the PrepareForConnection message containing the connection ID and the media forwarding ID to the media renderer, and the media renderer constructs the stream forwarding ID using the ID information of the PrepareForConnection message, and registers the stream forwarding ID to the media server by using a Generic Attribute Register Protocol (GARP) of the Ethernet protocol.

In the preparing for the connection with the media server, the media server reserves a resource request according to a reservation protocol of the Ethernet protocol, and transmits a reservation signaling to the media renderer.

In the preparing for the connection with the media server, the media renderer constructs the stream forwarding ID when the plug ID received from the media server matches with the plug ID of the media renderer.

The plug ID may be one of the unique plug ID and a residential Ethernet LAN-wide unique plug ID.

In the multicasting of the media stream, the media stream is transmitted through an Ethernet protocol adaptation layer (PAL).

In the setting of a multicast connection with the media server, the multicast connection is set by the session set between the media server and the media renderer.

According to another aspect of the present invention, there may be provided an apparatus for transmitting a universal plug-and-play (UPNP) audio/video (A/V) stream, which includes a control point which transmits a PrepareForConnection message for a media stream transmission, and transmits a control command so that the media stream is transmitted, a media server which receives the PrepareForConnection message, reserves a resource request, and multicasts the media stream according to the control command, and a media renderer which, in response to the PrepareForConnection message, prepares for a connection with the media server to discover a service according to an Ethernet protocol, constructs a stream forwarding identifier (ID) using ID information of the PrepareForConnection message, and sets a connection using the stream forwarding ID to receive the media stream.

The media renderer disconnects from the media server when the transmission of the media stream is completed.

The Ethernet protocol may include a residential Ethernet (ResE) subscription protocol.

The control point requests a connection management/protocol information by transmitting a connection manager message to the media renderer, receives a protocol/format list from the media renderer, and selects one protocol/format from the received list.

The control point requests the preparation connection by transmitting a PrepareForConnection message to the media server, and receives a connection ID containing a plug ID and a stream forwarding ID from the media server.

The control point requests preparation of connection by transmitting the PrepareForConnection message containing the connection ID and the media forwarding ID to the media renderer, and the media renderer receives the stream forwarding ID constructed by using the ID information of the PrepareForConnection message, and registers the stream forwarding ID to the media server by using a Generic Attribute Register Protocol (GARP) of the Ethernet protocol.

The media renderer constructs the stream forwarding ID when the plug ID received from the media server matches with the plug ID of the media renderer.

The plug ID may be one of the unique plug ID and a residential Ethernet LAN-wide unique plug ID.

The media stream is transmitted through an Ethernet protocol adaptation layer (PAL).

BRIEF DESCRIPTION OF THE DRAWINGS

The above aspects and features of the present invention will be more apparent by describing certain embodiments of the present invention with reference to the accompanying drawings, in which:

FIG. 2 is a flowchart explaining a method for transmitting UPnP-AV stream according to an exemplary embodiment of the present invention.

DETAILED DESCRIPTION OF EXEMPLARY EMBODIMENTS

Figure 1:
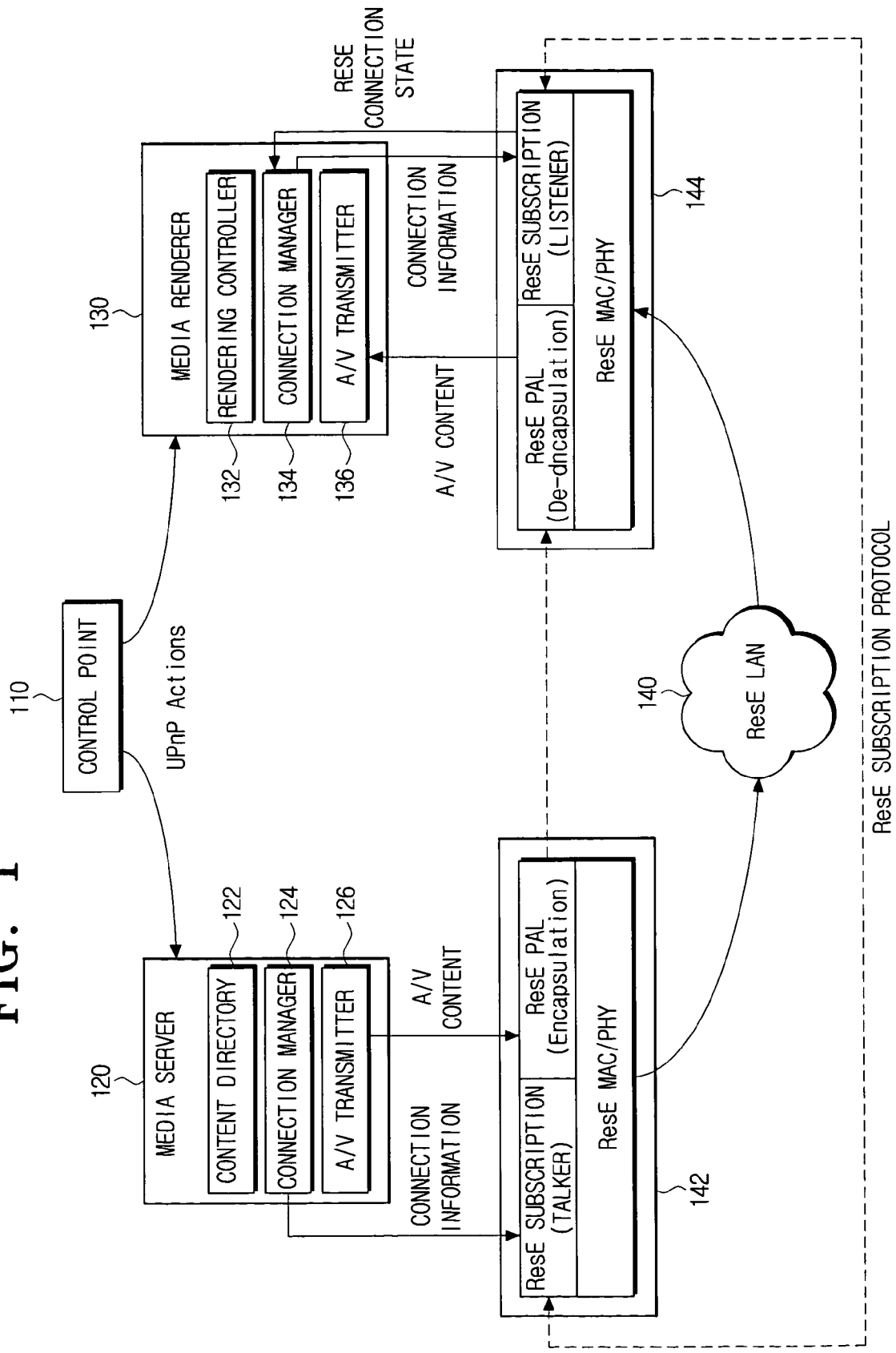
FIG. 1 is a view schematically illustrating the construction of an apparatus for transmitting a UPnP-AV stream according to an exemplary embodiment of the present invention.

Certain embodiments of the present invention will be described in greater detail with reference to the accompanying drawings. In the whole description of the present invention, the same drawing reference numerals are used for the same elements across various figures. The conventional elements or their detailed description will be omitted if it is determined that they impede the subject matter of the present invention.

FIG. 1 is a view schematically illustrating the construction of an apparatus for transmitting a UPNP-AV stream according to an exemplary embodiment of the present invention The apparatus for transmitting UPnP-AV stream according to one aspect of the present invention includes a control point 110, a media server 120, a media renderer 130, a residential Ethernet LAN (hereinafter referred to as a "ResE LAN") 140, a talker-side bridge device 142, and a listener-side bridge device 144.

The control point 110 commands that the media server 120 provides a isochronous stream to the media renderer 130. For example, the control point 110 may be a remote controller for sending a control command.

The media server 120 is a talker that provides the media stream, and includes a content directory 122, a connection manager 124, and an A/V transmitter 126.

The media server 120 reserves the transmission of the media stream according to the control command from the control point 110 regarding the request for the media stream, and transmits the media stream to the media renderer 130 on the basis of reservation information. For example, the media server 120 may be a DVD player.

In the media server 120, the content directory stores diverse kinds of media streams.

The connection manager 124 provides connection information for setting a media session in order to provide the media stream.

The A/V transmitter 126 transmits the media stream, which has been reserved for transmission, to the talker-side bridge device 142.

The media renderer 130 is a listener that receives, and displays the media stream, and includes a rendering controller 132, a connection manager 134, and an A/V transmitter 136.

The rendering controller 132 controls an in-band A/V stream to be received according to the ResE subscription protocol.

The connection manager 134 provides the listener-side bridge device 144 with connection information required for setting a media session in order to receive the media stream.

The A/V transmitter 136 receives A/V content from the listener-side bridge device 144.

The ResE LAN 140 is a communication network for a short-distance communication such as a home network.

On the other hand, the talker-side bridge device 142 includes a ResE subscription protocol, a ResE PAL, and a ResE MAC/PHY. The talker-side bridge device 142 sets a connection session with the listener-side bridge device 144 via the ResE LAN 140, based on the connection information received from the media server 120 through the ResE MAC/PHY. Then, it transmits the A/V content received from the media server 120 through the connection session to the listener-side bridge device 144.

Also, the talker-side bridge device 142 sets a connection session with the listener-side bridge device 144 according to the ResE subscription protocol, and transmits the A/V content according to the ResE subscription protocol.

On the other hand, the listener-side bridge device 144 includes a ResE PAL, a ResE subscription protocol, and a ResE MAC/PHY. The listener-side bridge device 144 receives the A/V content through a physical layer of the ResE MAC/PHY, and receives the A/V content through the ResE PAL. Also, it receives the A/V content from the talker-side bridge device 142 according to the ResE subscription protocol.

FIG. 2 is a flowchart explaining a method for transmitting a UPnP-AV stream according to an embodiment of the present invention.

In the present invention, a new protocol type for the UPnP-AV stream is defined. According to the new transmission protocol, the media stream is transmitted on the Residential Ethernet (ResE) through the protocol adaptation layer (PAL). In network, all ResE devices are assumed to be a part of the same LAN, and then this identifier is not needed. It will be defined in ResE-PAL to identify different content formats and corresponding ResE encapsulation formats. Additional information includes resource information, a talker-side MAC address, and other vender particulars information. The resource information is used by the media server 120 to decide what kinds of ResE resources should be reserved when it processes the subscription protocol.

First of all, the control pint 110 executes service discovery between the media server 120 and the media renderer 130. That is, the media renderer 130 confirms the connection for transmitting media stream between the media server 120 and the media renderer 130. If a user manipulates the control point 110 to transmit the A/V content, the control point 110 transmits an operation control command to the media server 120, and the media server 120 transmits content objects to the control point 110 (S202). The user selects a contents object to display, through the control point 110.

Also, the control point 110 requests connection management/protocol information to the media renderer 130 by transmitting a connection manager message to the media renderer 130. For this, the media renderer 130 provides a protocol/format list to the control point 110 (S204).

The control point 110 selects a protocol and format from the protocol/format list, which matches with the protocol and format of the contents object to display (S206).

Then, the control point 110 requests that the media server 120 prepare for the connection by transmitting a "PrepareForConnection" message to the media server 120. When the "PrepareForConnection" message is transmitted to the media server 120 from the control point 110, the resource information is filled in an addition information field of a protocol information parameter by the control point 110, and is transferred to the media server 120.

The media server 120 transmits a connection ID including a plug ID, and an A/V forwarding ID to the control point 110 (S208).

Accordingly, the control point 110 adds the connection ID including the plug ID, and the AV forwarding ID, which are received from the media server 120, to the "PrepareForConnection" message, and requests the media renderer 130 for the preparation of connection by transmitting the "PrepareForConnection" message thereto (S210).

The media renderer 130 includes the MAC address of the media server, and also includes a unique plug ID conveyed by a peer connection ID parameter.

The MAC address of the media server and the unique plug ID are used by the media renderer 130 according to the ResE subscription protocol. In this case, the plug ID may be one of the unique plug ID and a ResE LAN-wide unique plug ID.

Accordingly, the media renderer 130, using the "PrepareForConnection" message including the unique plug ID, confirms if the plug ID of the media server 120 matches its own plug ID (S212).

When the plug ID matches, the media renderer 130 constructs a stream forwarding identifier (ID) using information of the connection (i.e., "PrepareForConnection") message. The media renderer 130 requests resources to the media server 120 by registering the stream forwarding ID in the media server 120, using a Generic Attribute Registration Protocol (GARP) of the ResE subscription protocol (S214).

The media server 120 reserves the resource request according to the reservation protocol of the ResE subscription protocol, and transmits a reservation signaling to the media renderer 130 (S218).

The media renderer 130 receives the reservation signaling, recognizes the result of subscription to the ResE protocol via the connection manager 134, and transmits the result to the control point 110 (S220).

After that, a session is set through the ResE PAL of the talker-side bridge device 142 and the listener-side bridge device 144 between the media server 120 and the media renderer 130, and a connection is made (S222).

The media server 120 transmits the A/V stream to the listener-side bridge device 144 through the ResE PAL of the talker-side bridge device 142 according to the ResE subscription protocol (S224). The talker-side bridge device 142 transmits the A/V stream to the renderer 130 via the listener-side bridge device 144, through the ResE-PAL.

When the display of the media contents is finished, the user performs key input through the control point 110 so that the transmission of the A/V contents is finished (S226). Accordingly, the control point 110 transmits a transmission end message to the media renderer 130, and receives a resultant message from the media renderer 130 (S222).

As a result, the media renderer 130 disconnects from the media server 120 (S228).

As described above, according to the present invention, an integrated transmission protocol, which combines the residential Ethernet protocol and the UpnP protocol. Also, a secured quality of service (QoS) can be provided for the UPnP-AV stream.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of transmitting a universal plug and play (UPnP) audio/video (A/V) stream, comprising:
a media renderer, preparing for a connection with a media server to discover a service according to an Ethernet protocol;
the media renderer, setting a multicast connection with the media server; and
the media server, multicasting the media stream to the media renderer according to the Ethernet protocol,
wherein, in the preparing for the connection, the media renderer constructs a stream forwarding identifier (ID) using a PrepareForConnection message received from a control point, and registers the stream forwarding ID to the media server using a Generic Attribute Register Protocol (GARP) of the Ethernet protocol.

2. The method of claim 1, further comprising, after the multicasting of the media stream, the media renderer disconnecting from the media server when the transmission of the media stream is completed.

3. The method of claim 1, wherein the Ethernet protocol comprises a residential Ethernet (ResE) subscription protocol.

4. The method of claim 1, wherein in the preparing for the connection with the media server, a control point, which transmits a control command about the transmission of the media stream, requests a connection management/protocol information by transmitting a connection manager message to the media renderer, receives a protocol/format list from the media renderer and selects one protocol/format from the received list.

5. The method of claim 4, wherein in the preparing for the connection with the media server, the control point requests the preparation connection by transmitting a PrepareForConnection message to the media server, and the media server transmits a connection ID containing a plug ID and a stream forwarding ID to the control point.

6. A method of transmitting a universal plug and play (UPnP) audio/video (A/V) stream, comprising:
a media renderer, preparing for a connection with a media server to discover a service according to an Ethernet protocol;
the media renderer, setting a multicast connection with the media server;
wherein in the preparing for the connection with the media server, a control point, which transmits a control command about the transmission of the media stream, requests a connection management/protocol information by transmitting a connection manager message to the media renderer, receives a protocol/format list from the media renderer and selects one protocol/format from the received list;

wherein in the preparing for the connection with the media server, the control point requests the preparation connection by transmitting a PrepareForConnection message to the media server, and the media server transmits a connection ID containing a plug ID and a stream forwarding ID to the control point;

the media server, multicasting the media stream to the media renderer according to the Ethernet protocol; and wherein in the preparing for the connection with the media server, the control point requests preparation of connection by transmitting the PrepareForConnection message containing the connection ID and the media forwarding ID to the media renderer, and the media renderer constructs the stream forwarding ID using the ID information of the PrepareForConnection message, and registers the stream forwarding ID to the media server by using a Generic Attribute Register Protocol (GARP) of the Ethernet protocol.

7. The method of claim 6, wherein in the preparing for the connection with the media server, the media server reserves a resource request according to a reservation protocol of the Ethernet protocol, and transmits a reservation signaling to the media renderer.

8. The method of claim 6, wherein in the preparing for the connection with the media server, the media renderer constructs the stream forwarding ID when the plug ID received from the media server matches with the plug ID of the media renderer.

9. The method of claim 8, wherein the plug ID is one of the unique plug ID and a residential Ethernet LAN-wide unique plug ID.

10. The method of claim 1, wherein in the multicasting of the media stream, the media stream is transmitted through an Ethernet protocol adaptation layer (PAL).

11. The method of claim 1, wherein in the setting of a multicast connection with the media server, the multicast connection is set by the session set between the media server and the media renderer.

12. An apparatus for transmitting a universal plug and play (UPNP) audio/video (A/V) stream, comprising:
    a control point which transmits a PrepareForConnection message for a media stream transmission, and transmits a control command so that the media stream is transmitted;
    a media server which receives the PrepareForConnection message, reserves a resource request, and multicasts the media stream according to the control command; and
    a media renderer which, in response to the PrepareForConnection message, prepares for a connection with the media server to discover a service according to an Ethernet protocol, constructs a stream forwarding identifier (ID) using ID information of the PrepareForConnection message, and sets a connection using the stream forwarding ID to receive the media stream,
    wherein the media renderer registers the stream forwarding identifier (ID) to the media server using a Generic Attribute Register Protocol (GARP) of the Ethernet protocol.

13. The apparatus of claim 12, wherein the media renderer disconnects from the media server when the transmission of the media stream is completed.

14. The apparatus of claim 12, wherein the Ethernet protocol comprises a residential Ethernet (ResE) subscription protocol.

15. The apparatus of claim 12, wherein the control point requests a connection management/protocol information by transmitting a connection manager message to the media renderer, receives a protocol/format list from the media renderer, and selects one protocol/format from the received list.

16. The apparatus of claim 12, wherein the control point requests the preparation connection by transmitting a PrepareForConnection message to the media server, and receives a connection ID containing a plug ID and a stream forwarding ID from the media server.

17. The apparatus of claim 12, wherein the control point requests preparation of connection by transmitting the PrepareForConnection message containing the connection ID and the media forwarding ID to the media renderer, and the media renderer receives the stream forwarding ID constructed by using the ID information of the PrepareForConnection message, and registers the stream forwarding ID to the media server by using the Generic Attribute Register Protocol (GARP) of the Ethernet protocol.

18. The apparatus of claim 17, wherein the media renderer constructs the stream forwarding ID when the plug ID received from the media server matches with the plug ID of the media renderer.

19. The apparatus of claim 18, wherein the plug ID is one of the unique plug ID and a residential Ethernet LAN-wide unique plug ID.

20. The apparatus of claim 12, wherein the media stream is transmitted through an Ethernet protocol adaptation layer (PAL).

* * * * *